(12) United States Patent
Craig

(10) Patent No.: US 12,317,869 B2
(45) Date of Patent: Jun. 3, 2025

(54) WALL MOUNTED PET ACCESSORY TO PREVENT LIQUID AND RESIDUE ACCUMULATION BEHIND A FEEDING CONTAINER

(71) Applicant: Andrew Craig, San Clemente, CA (US)

(72) Inventor: Andrew Craig, San Clemente, CA (US)

(73) Assignee: Wall Pawtector LLC, San Clemente, CA (US)

( * ) Notice: Subject to any disclaimer, the term of this patent is extended or adjusted under 35 U.S.C. 154(b) by 202 days.

(21) Appl. No.: 18/212,892

(22) Filed: Jun. 22, 2023

(65) Prior Publication Data

US 2024/0423158 A1    Dec. 26, 2024

(51) Int. Cl.
*F16M 11/00* (2006.01)
*A01K 5/01* (2006.01)

(52) U.S. Cl.
CPC .................... *A01K 5/0135* (2013.01)

(58) Field of Classification Search
CPC ............................ A01K 5/0135; A01K 5/0114
See application file for complete search history.

(56) References Cited

U.S. PATENT DOCUMENTS

| | | |
|---|---|---|
| 1,970,054 A | 8/1934 | Nordan |
| 2,320,828 A | 6/1943 | Murphy |
| 2,482,376 A | 9/1949 | Serkland |
| 2,580,103 A | 12/1951 | Keller et al. |
| 2,845,896 A | 8/1958 | Ernest |
| 3,651,787 A | 3/1972 | Cooper |
| 4,196,693 A | 4/1980 | Unversaw |

(Continued)

FOREIGN PATENT DOCUMENTS

| | | |
|---|---|---|
| CN | 210929087 U | 7/2020 |
| DE | 112017000041 T5 | 2/2019 |

(Continued)

OTHER PUBLICATIONS

US Trademark U.S. Appl. No. 97/801,413; Mark—Wallpawtector filed Feb. 19, 2023.

(Continued)

*Primary Examiner* — Amy J. Sterling
(74) *Attorney, Agent, or Firm* — LEGALFORCE RAPC WORLDWIDE

(57) ABSTRACT

Disclosed are a method, a device, and/or a system of a wall-mounted pet accessory to prevent liquid and residue accumulation behind a feeding container. In one aspect, a pet accessory includes a rectangular surface, a first double-headed pin, and a second double-headed pin. The rectangular surface molded from silicone material has a width wider than a height. A first hole and a second hole is formed along the width of the pet accessory. The first double-headed pin includes a lower circular base portion, an upper circular base portion, a cylindrical spacer, and a long cylindrical shaft pin. A first indentation area is created between the lower and upper circular base portions of the first double-headed pin. A second indentation area is created between the lower and upper circular base portions of the second double-headed pin. The long cylindrical shaft pin is used to insert in a vertical surface.

20 Claims, 4 Drawing Sheets

(56) References Cited

U.S. PATENT DOCUMENTS

| | | | |
|---|---|---|---|
| 4,532,891 | A | 8/1985 | Jones |
| 4,699,089 | A | 10/1987 | Teschke |
| 5,881,670 | A | 3/1999 | Pelsor |
| 6,209,487 | B1 | 4/2001 | Quinlan et al. |
| 6,718,714 | B1* | 4/2004 | Montgomery, Sr. ............ F24D 13/022 52/177 |
| 7,124,709 | B1 | 10/2006 | Greer |
| 7,600,486 | B2 | 10/2009 | Ellis |
| 7,748,538 | B2 | 7/2010 | Esrich |
| 8,516,975 | B2 | 8/2013 | Becattini et al. |
| 8,757,140 | B2 | 6/2014 | Hatjopoulos et al. |
| 8,844,466 | B2 | 9/2014 | Vermeegen |
| 9,238,907 | B2 | 1/2016 | Murray |
| 9,365,385 | B2 | 6/2016 | Muxlow |
| 10,117,545 | B2 | 11/2018 | Nelson et al. |
| 10,321,662 | B2 | 6/2019 | Conley |
| 10,412,929 | B2 | 9/2019 | Kasper |
| 10,813,343 | B1 | 10/2020 | Hill |
| 11,109,567 | B2 | 9/2021 | Matheson |
| 11,751,536 | B2 | 9/2023 | Marker et al. |
| 2005/0246989 | A1 | 11/2005 | Pringle et al. |
| 2007/0272163 | A1 | 11/2007 | Leary |
| 2007/0280782 | A1* | 12/2007 | Rogers ............ E01C 9/086 404/35 |
| 2008/0283719 | A1 | 11/2008 | Lowry et al. |
| 2009/0241843 | A1 | 10/2009 | Becattini, Jr. et al. |
| 2014/0304999 | A1 | 10/2014 | Robert |
| 2017/0280676 | A1 | 10/2017 | Mendez |
| 2020/0288669 | A1 | 9/2020 | Maring-Teichmann et al. |
| 2021/0363758 | A1 | 11/2021 | Creech et al. |
| 2022/0042235 | A1* | 2/2022 | Herny ............ A47K 3/002 |

FOREIGN PATENT DOCUMENTS

| | | |
|---|---|---|
| JP | 7015046 B2 | 2/2022 |
| KR | 200479734 Y1 | 3/2016 |
| WO | 2004105467 A2 | 12/2004 |
| WO | 2018211520 A1 | 11/2018 |
| WO | 2023010986 A1 | 2/2023 |
| WO | 2023019277 A1 | 2/2023 |

OTHER PUBLICATIONS

"Backsplash Protector Glass Splash Guard for Stove and Wall, Oilproof Waterproof and High Temperature Resistant, Removable Adhesive for Kitchen Walls Cupboard Doors and Stove Splash Guard" Published at Duprima, by Shopify, Found online on [Sep. 21, 2023] https://shorturl.at/lvBP6.

"Developing a Dishwasher Splash Guard", Published at Chalmers University of Technology, by Akhilesh Krishna, Published in [2018] https://odr.chalmers.se/server/api/core/bitstreams/73a56d1f-38de-4bcc-bec9-a758dd422231/content.

Wall Protection, Published at National Institute of Health, by Design Requirements Manual , Published on [Apr. 2016] https://shorturl.at/deisU.

"Floor and wall solutions for commercial kitchens", Published at Altro, by Richard Mallett, Found Online on [Sep. 21, 2023] https://www.altro.com/getmedia/2437d2c3-bcd3-4e9d-a51c-70ea3f426fee/Commercial-Kitchens-Brochure_WEB.pdf.

"Wall Guard", Published at Inpro Corporation, by Greenguard, Found Online on [Sep. 21, 2023] https://www.thecornerguardstore.com/content/submittals/inpro/wg/1800i_1800iw_wall-guard_specifications_362_rev_5.pdf.

"The "Splatter-Woof" Wall Guard", by WallPawtector, Published in [2023] https://wallpawtector.com/cdn/shop/files/Still_0008_Layer_5.jpg?v=1668643132&width=1100.

"Elevated Pet Feeding Tray with splash guard and non-skid feet", by Petmaker, Published on [Mar. 16, 2017] https://m.media-amazon.com/images/I/71rS5jkQe8L._AC_SX300_SY300_QL70_FMwebp_.jpg.

"Single / Double Bowl Wall Mounted Dog Bowl Holder", by Lola and Daisy, Found Online on [Sep. 21, 2023] https://www.lolaanddaisydesigns.co.uk/cdn/shop/products/lap_640x640.2633358988_fo0xxajv_493x.jpg?v=1684572466.

"Automatic Pet Water Bowl (Cabinet Mount)", by Perpetual Well, Published on [Jul. 10, 2019] https://m.media-amazon.com/images/I/810FyxWoPrL._AC_SX679_.jpg.

"Splash guard for feeding station feeding bowl for dogs and cats New and Useful", by Etsy, Found Online on [Sep. 21, 2023] https://i.etsystatic.com/31557775/r/il/8afb2d/3322787317/il_794xN.3322787317_eeo6.jpg.

* cited by examiner

WALL MOUNTED PET ACCESSORY TO PREVENT LIQUID AND RESIDUE ACCUMULATION BEHIND A FEEDING CONTAINER

CLAIM OF PRIORITY

This patent application is a conversion application of, and claims priority to U.S. Provisional Patent Application No. 43/423,287 titled A MAT WHICH PROTECTS WALL/SURFACE AREA BEHIND DOG BOWLS, HANGS ON WALL/SURFACE, REMOVABLE FOR CLEANING, filed on Nov. 7, 2022.

FIELD OF TECHNOLOGY

This disclosure relates generally to interior wall protection device and, more particularly, to a method, a device, and/or a system of a wall-mounted pet accessory to prevent liquid and residue accumulation behind a feeding container.

BACKGROUND

A dog is a domesticated animal bred over centuries from a wolf (e.g., a wild carnivorous mammal living and hunting in packs). The dog may live inside a home of an owner (e.g., a person, a family) and serve as a loyal companion to the owner. The dog may be bred and sold in a variety of sizes and shapes based on the preference of the owner. As a result, the dog may not be able to survive in a wilderness because its adaptations may not match natural selection. Specifically, the dog may be bred to have traits that are desired by the owner (e.g., long hair, long snout, short snout, short legs, long legs, etc.), but which would otherwise not enable the dog to survive in the wilderness because those traits may not lead to self-sufficiency in hunting prey, protecting against diseases and predators, and/or finding shelter.

For example, a snout of the dog may include a projecting nose and a mouth that is derived from the wolf. However, unlike the wolf, an anatomy of the snout of the dog may not be ideally suited for survival. An inefficient mouth size, tongue shape, and/or leg height of the dog may lead to some food and water particles not entering a stomach cavity of the dog, but rather exiting outward onto a floor and/or a wall in the home when the dog is attempting to consume foods or liquids from a feeding tray (e.g., a water bowl, a food bowl, etc). This can lead to unsightly smells, odor, and stains caused on the wall of the home when the feeding tray is placed next to the wall of the home. The home may lose value because the mold formed within the home may lead to structural damage. In addition, food and water particles not being wiped from the wall of the home may lead to long-term odors which may be difficult to eliminate. Over time, bacteria and mold may form in the home, which can be deleterious to the health of the owner, and possibly lead to allergies in the owner that may be difficult to resolve. In extreme circumstances, black mold may form in the home, which can even lead to death of the owner.

SUMMARY

Disclosed are a method, a device, and/or a system of a wall-mounted pet accessory to prevent liquid and residue accumulation behind a feeding container.

In one aspect, a pet accessory includes a rectangular surface, a first double-headed pin, and a second double-headed pin. The rectangular surface may be molded from silicone material for use having a width that is wider than a height. A first hole is formed on an upper-left corner of an upper surface of the rectangular surface along the width of a left side of the pet accessory and a second hole is formed on an upper-right corner of the upper surface of the rectangular surface along the width of a right side of the pet accessory. The first double-headed pin includes a lower circular base portion, an upper circular base portion, a cylindrical spacer, and a long cylindrical shaft pin.

The lower circular base portion of the first double-headed pin is separated from its upper circular base portion by approximately half the width of the upper circular base portion. The cylindrical spacer is fixed in place centrally positioned between the lower and upper circular base portions of the first double-headed pin resulting in the creation of a first indentation area. The lower circular base portion of the first double-headed pin having the long cylindrical shaft pin is used to insert in a vertical surface.

The second double-headed pin includes the lower circular base portion, the upper circular base portion, the cylindrical spacer, and the long cylindrical shaft pin. The lower circular base portion of the second double-headed pin is separated from its upper circular base portion by approximately half the width of the upper circular base portion. The cylindrical spacer is fixed in place centrally positioned between the lower and upper circular base portions of the first double-headed pin resulting in the creation of a second indentation area. The lower circular base portion of the second double-headed pin having the long cylindrical shaft pin is used to insert in the vertical surface.

The pet accessory may be mounted on a wall of a home and washable in a dishwasher. The pet accessory may prevent liquid and/or residue accumulation behind a feeding container in the home. The pet accessory may be designed for a domesticated canine animal such that when the domestic canine animal feeds itself from the feeding container placed immediately in front of the pet accessory which is perpendicularly hung on a vertical surface, the pet accessory may capture splattered a food and/or a liquid which inadvertently exits the feeding container when the domesticated canine animal is accessing the food and/or the liquid from the feeding container.

The first double-headed pin may be penetrable into the vertical surface through the long cylindrical shaft pin of the first double-headed pin that extends from the lower circular base portion of the first double-headed pin. The lower circular base portion of the first double-headed pin may flush against the vertical surface when the long cylindrical shaft pin is fully inserted into the vertical surface, such that the cylindrical spacer and/or the upper circular base portion of the first double-headed pin protrudes from the surface of the wall.

The second double-headed pin may be penetrable into the vertical surface through the long cylindrical shaft pin of the second double-headed pin that extends from the lower circular base portion of the second double-headed pin. The lower circular base portion of the second double-headed pin may flush against the vertical surface when the long cylindrical shaft pin is fully inserted into the vertical surface, such that the cylindrical spacer and/or the upper circular base portion of the second double-headed pin protrudes from the surface of the wall. The first hole of the rectangular surface may be slightly larger in area than the first upper circular base portion, such that the rectangular surface can be placed on the cylinder spacer between the lower circular base portion and the upper circular base portion of the first double-headed pin.

The second hole of the rectangular surface may be slightly larger in area than the second upper circular base portion, such that the rectangular surface can be placed on the cylinder spacer between the lower circular base portion and the upper circular base portion of the second double-headed pin. The first indentation area created by the cylindrical spacer of the first double-headed pin may allow for secure attachment of the rectangular surface to the first double-headed pin preventing accidental dislodging and/or detachment. The second indentation area created by the cylindrical spacer of the second double-headed pin may allow for secure attachment of the rectangular surface to the second double-headed pin ensuring stability and/or preventing movement during use.

In another aspect, a pet accessory includes a rectangular surface and a pair of double-headed pins. A first hole is formed on an upper-left corner of an upper surface of the rectangular surface along the width of a left side of the pet accessory, and a second hole is formed on an upper-right corner of the upper surface of the rectangular surface along the width of a right side of the pet accessory. Each pair of double-headed pins has a lower circular base portion, an upper circular base portion, a cylindrical spacer, and a long cylindrical shaft pin. The pair of double-headed pins are used to secure the rectangular surface to a wall of a home.

In yet another aspect, a pet accessory includes a rectangular surface, a first double-headed pin, and a second double-headed pin. A first hole is formed on an upper-left corner of an upper surface of the rectangular surface along the width of a left side of the pet accessory. A second hole is formed on an upper-right corner of the upper surface of the rectangular surface along the width of a right side of the pet accessory. The first double-headed pin includes a lower circular base portion, an upper circular base portion, a cylindrical spacer, and a long cylindrical shaft pin.

The lower circular base portion of the first double-headed pin is separated from its upper circular base portion by approximately half the width of the upper circular base portion. The cylindrical spacer is fixed in place, centrally positioned between the lower and upper circular base portions of the first double-headed pin, resulting in the creation of a first indentation area. The lower circular base portion of the first double-headed pin having the long cylindrical shaft pin is used to insert in a vertical surface.

The second double-headed pin includes the lower circular base portion, the upper circular base portion, the cylindrical spacer, and the long cylindrical shaft pin. The lower circular base portion of the second double-headed pin is separated from its upper circular base portion by approximately half the width of the upper circular base portion. The cylindrical spacer is fixed in place, centrally positioned between the lower and upper circular base portions of the second double-headed pin resulting in the creation of a second indentation area. The lower circular base portion of the second double-headed pin having the long cylindrical shaft pin is used to insert in the vertical surface.

The methods and systems disclosed herein may be implemented in any means for achieving various aspects and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Figure 1A:
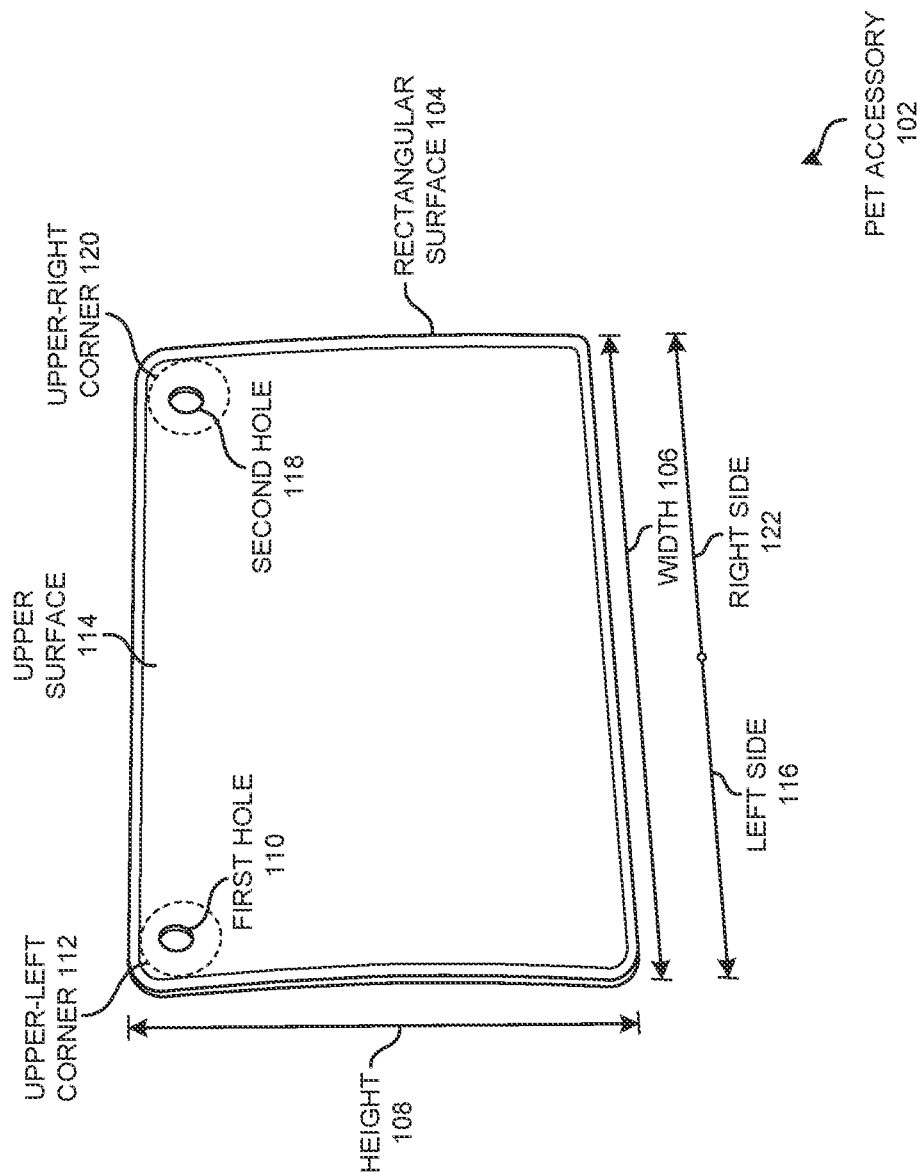
FIG. 1A is a conceptual view of a pet accessory illustrating the constituting elements of a rectangular surface forming the pet accessory, according to one embodiment.

Other features of the present embodiments will be apparent from the accompanying drawings and from the detailed description that follows.

DETAILED DESCRIPTION

Example embodiments, as described below, may be used to provide a method, a system and/or a device of a wall-mounted pet accessory to prevent liquid and residue accumulation behind a feeding container.

In one embodiment, a pet accessory 102 includes a rectangular surface 104, a first double-headed pin 124, and a second double-headed pin 136. The rectangular surface 104 may be molded from silicone material for use having a width 106 that is wider than a height 108. A first hole 110 is formed on an upper-left corner 112 of an upper surface 114 of the rectangular surface 104 along the width 106 of a left side 116 of the pet accessory 102 and a second hole 118 is formed on an upper-right corner 120 of the upper surface 114 of the rectangular surface 104 along the width 106 of a right side of the pet accessory 102. The first double-headed pin 124 includes a lower circular base portion 126, an upper circular base portion 128, a cylindrical spacer 130, and a long cylindrical shaft pin (e.g., puncturing pin 132).

The lower circular base portion 126 of the first double-headed pin 124 is separated from its upper circular base portion 128 by approximately half the width 106 of the upper circular base portion 128. The cylindrical spacer 130 is fixed in place centrally positioned between the lower and upper circular base portions 128 of the first double-headed pin 124 resulting in the creation of a first indentation area 134. The lower circular base portion 126 of the first double-headed pin 124 having the long cylindrical shaft pin (e.g., puncturing pin 132) is used to insert in a vertical surface 202.

The second double-headed pin 136 includes the lower circular base portion 126, the upper circular base portion 128, the cylindrical spacer 130, and the long cylindrical shaft pin (e.g., puncturing pin 132). The lower circular base portion 126 of the second double-headed pin 136 is separated from its upper circular base portion 128 by approximately half the width 106 of the upper circular base portion 128. The cylindrical spacer 130 is fixed in place centrally positioned between the lower and upper circular base portions 128 of the first double-headed pin 124 resulting in the creation of a second indentation area 138. The lower circular base portion 126 of the second double-headed pin 136 having the long cylindrical shaft pin (e.g., puncturing pin 132) is used to insert in the vertical surface 202.

The pet accessory 102 may be mounted on a wall of a home and washable in a dishwasher. The pet accessory 102 may prevent liquid and/or residue accumulation behind a feeding container (e.g., food bowl 204) in the home. The pet accessory 102 may be designed for a domesticated canine animal such that when the domestic canine animal feeds itself from the feeding container (e.g., food bowl 204) placed immediately in front of the pet accessory 102 which is perpendicularly hung on a vertical surface 202. The pet accessory 102 may capture splattered a food and/or a liquid, which inadvertently exits the feeding container (e.g., food bowl 204) when the domesticated canine animal is accessing the food and/or the liquid from the feeding container (e.g., food bowl 204).

The first double-headed pin 124 may be penetrable into the vertical surface 202 through the long cylindrical shaft pin (e.g., puncturing pin 132) of the first double-headed pin 124 that extends from the lower circular base portion 126 of the first double-headed pin 124. The lower circular base portion 126 of the first double-headed pin 124 may flush against the vertical surface 202 when the long cylindrical shaft pin (e.g., puncturing pin 132) is fully inserted into the vertical surface 202, such that the cylindrical spacer 130 and/or the upper circular base portion 128 of the first double-headed pin 124 protrudes from the surface of the wall.

The second double-headed pin 136 may be penetrable into the vertical surface 202 through the long cylindrical shaft pin (e.g., puncturing pin 132) of the second double-headed pin 136 that extends from the lower circular base portion 126 of the second double-headed pin 136. The lower circular base portion 126 of the second double-headed pin 136 may flush against the vertical surface 202 when the long cylindrical shaft pin (e.g., puncturing pin 132) is fully inserted into the vertical surface 202, such that the cylindrical spacer 130 and/or the upper circular base portion 128 of the second double headed pin protrudes from the surface of the wall. The first hole 110 of the rectangular surface 104 may be slightly larger in area than the first upper circular base portion 128, such that the rectangular surface 104 can be placed on the cylinder spacer 130 between the lower circular base portion 126 and the upper circular base portion 128 of the first double-headed pin 124.

The second hole 118 of the rectangular surface 104 may be slightly larger in area than the second upper circular base portion 128, such that the rectangular surface 104 can be placed on the cylinder spacer 130 between the lower circular base portion and the upper circular base portion of the second double headed pin. The first indentation area 134 created by the cylindrical spacer 130 of the first double-headed pin 124 may allow for secure attachment of the rectangular surface 104 to the first double-headed pin 124 preventing accidental dislodging and/or detachment. The second indentation area 138 created by the cylindrical spacer 130 of the second double-headed pin 136 may allow for secure attachment of the rectangular surface 104 to the second double-headed pin 136 ensuring stability and/or preventing movement during use.

In another embodiment, a pet accessory 102 includes a rectangular surface 104 and a pair of double-headed pins. A first hole 110 is formed on an upper-left corner 112 of an upper surface 114 of the rectangular surface 104 along the width 106 of a left side 116 of the pet accessory 102, and a second hole 118 is formed on an upper-right corner 120 of the upper surface 114 of the rectangular surface 104 along the width 106 of a right side 122 of the pet accessory 102. Each pair of double-headed pins has a lower circular base portion 126, an upper circular base portion 128, a cylindrical spacer 130, and a long cylindrical shaft pin (e.g., puncturing pin 132). The pair of double-headed pins are used to secure the rectangular surface 104 to a wall of a home.

In yet another embodiment, a pet accessory 102 includes a rectangular surface 104, a first double-headed pin 124, and a second double-headed pin 136. A first hole 110 is formed on an upper-left corner 112 of an upper surface 114 of the rectangular surface 104 along the width 106 of a left side 116 of the pet accessory 102. A second hole 118 is formed on an upper-right corner 120 of the upper surface 114 of the rectangular surface 104 along the width 106 of a right side 122 of the pet accessory 102. The first double-headed pin 124 includes a lower circular base portion 126, an upper circular base portion 128, a cylindrical spacer 130, and a long cylindrical shaft pin (e.g., puncturing pin 132).

The lower circular base portion 126 of the first double-headed pin 136 is separated from its upper circular base portion 128 by approximately half the width 106 of the upper circular base portion 128. The cylindrical spacer 130 is fixed in place, centrally positioned between the lower and upper circular base portion 128s of the first double-headed pin 124, resulting in the creation of a first indentation area 134. The lower circular base portion 126 of the first double-headed pin 136 having the long cylindrical shaft pin (e.g., puncturing pin 132) is used to insert in a vertical surface 202.

The second double-headed pin 136 includes the lower circular base portion 126, the upper circular base portion 128, the cylindrical spacer 130, and the long cylindrical shaft pin (e.g., puncturing pin 132). The lower circular base portion 126 of the second double-headed pin 136 is separated from its upper circular base portion 128 by approximately half the width 106 of the upper circular base portion 128. The cylindrical spacer 130 is fixed in place, centrally positioned between the lower and upper circular base portions (e.g., 126 and 128) of the second double-headed pin 136 resulting in the creation of a second indentation area 138. The lower circular base portion 126 of the second double-headed pin 136 having the long cylindrical shaft pin (e.g., puncturing pin 132) is used to insert in the vertical surface 202.

FIG. 1A is a conceptual view of a pet accessory 102 illustrating the constituting elements of a rectangular surface 104 forming the pet accessory 102, according to one embodiment. Particularly, FIG. 1A illustrates a pet accessory 102, a rectangular surface 104, a width 106, a height 108, a first hole 110, an upper-left corner 112, an upper surface 114, a left side 116, a second hole 118, an upper-right corner 120, and a right side 122, according to one embodiment.

The pet accessory 102 may be an item and/or a product designed and intended for use by a domesticated canine pet to enhance its comfort, well-being, and safety. The pet accessory 102 may be an appurtenance to a pet feeder that may be used to prevent liquid and residue accumulation behind the pet feeder (e.g., feeding tray 206) and/or a feeding container (e.g., food bowl 204), according to one embodiment.

The rectangular surface 104 may be a flat, equiangular quadrilateral pet accessory 102 having an exterior layer formulated to capture splattered food and/or liquid from the feeding tray 206. The rectangular surface 104 may be molded from silicone and/or polyurethane material for water resistance and flexibility to prevent food and/or liquid accumulation on a wall and/or a vertical surface 202 having the rectangular surface 104 installed on it. The width 106 may refer to the measurement and/or extent of the rectangular surface 104 from side to side, perpendicular to its length and/or height 108.

The height 108 may refer to the measurement and/or extent of the rectangular surface 104 from bottom to top, perpendicular to its width 106 and/or length. The first hole 110 may be a primary hollow place in the rectangular surface 104. It may be formed on the upper-left corner 112 of the upper surface 114 of the rectangular surface 104 along the width 106 of the left side 116 of the rectangular surface 104 to hold the first double-headed pin 124 when the rectangular surface 104 is installed on the wall and/or a vertical surface 202, according to one embodiment.

The upper-left corner 112 may be the area and/or a region of the rectangular surface 104 where the topmost and the sinistral edges meet and/or converge. The upper surface 114 may be the topmost region of the rectangular surface 104. The rectangular surface 104 may have the first hole 110 and the second hole 118 in the upper surface 114 region. The left side 116 may be the left-hand portion of the rectangular surface 104. The first hole 110 may be formed on the left side 116 of the rectangular surface 104, according to one embodiment.

The second hole 118 may be the secondary hollow place in the rectangular surface 104. It may be formed on the upper-right corner 120 of the upper surface 114 of the rectangular surface 104 along the width 106 of the right side 122 of the rectangular surface 104 to hold the second double-headed pin 136 when the rectangular surface 104 is installed on the wall and/or a vertical surface 202.

The upper-right corner 120 may be the area and/or a region of the rectangular surface 104 where the topmost and the dextral edges meet and/or converge. The right side 122 may be the right-hand portion of the rectangular surface 104. The second hole 118 may be formed on the right side 122 of the rectangular surface 104, according to one embodiment.

Figure 1B:
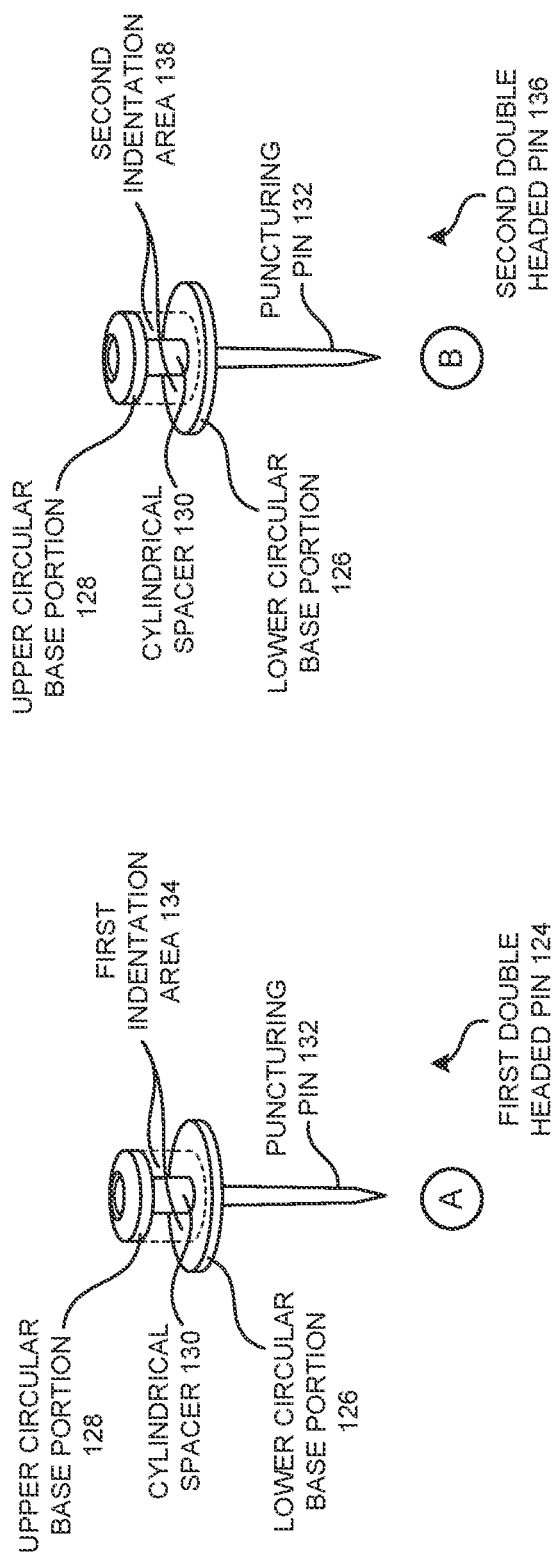
FIG. 1B is a continuation of the conceptual view of FIG. 1A illustrating the constituting components of the pet accessory, according to one embodiment.

FIG. 1B is a continuation of the conceptual view of FIG. 1A illustrating the constituting elements of the pet accessory 102, according to one embodiment. Particularly, FIG. 1 builds on FIG. 1A, and further adds, a first double-headed pin 124, a second double-headed pin 136, a lower circular base portion 126, an upper circular base portion 128, a cylindrical spacer 130, a puncturing pin 132, a first indentation area 134, and a second indentation area 138, according to one embodiment.

As shown in "A" of FIG. 1B, the first double-headed pin 124 may be a primary, small, sharp dual-headed nail having a metal and/or a plastic shaft with a pointed end (e.g., puncturing pin 132) on one edge and a smaller circular head (e.g., upper circular base portion 128) on the other edge and a larger circular head (e.g., lower circular base portion 126) in the intermediate position of the shaft. The first double-headed pin 124 may be inserted in the first hole 110 of the rectangular surface 104 to install the rectangular surface 104 in order to hang up against the wall quite snuggly.

As shown in "B" of FIG. 1B, the second double-headed pin 136 may be a secondary, small, sharp dual-headed nail having a metal and/or a plastic shaft with a pointed end (e.g., puncturing pin 132) on one edge and a smaller circular head (e.g., upper circular base portion 128) on the other edge and a larger circular head (e.g., lower circular base portion 126) in the intermediate position of the shaft. The second double-headed pin 136 may be inserted in the second hole 118 of the rectangular surface 104 to install the rectangular surface 104 in order to hang it up against the wall.

The first double-headed pin 124 and the second double-headed pin 136 may provide a secure hold and positioning of the rectangular surface 104 while allowing flexibility in adjusting and/or repositioning the pet accessory 102. The first double-headed pin 124 and the second double-headed pin 136 may allow for easy insertion and removal. The larger heads of the first double-headed pin 124 and the second double-headed pin 136 may provide stability and prevent the pin from being pushed through the vertical surface 202 entirely.

The heads (e.g., lower circular base portion 126, upper circular base portion 128) of the first double-headed pin 124 and the second double-headed pin 136 may be larger than the shaft and more prominent than those of regular pins, making them easier to handle, grip, and/or locate.

The lower circular base portion 126 may be the bottom disc-shaped support segment of the first double-headed pin 124 and/or the second double-headed pin 136. The lower circular base portion 126 of the first double-headed pin 124 and the second double-headed pin 136 may remain flush against the vertical surface 202 when the first double-headed pin 124 and/or the second double-headed pin 136 is inserted into the vertical surface 202 through the long cylindrical shaft pin (e.g., puncturing pin 132). The lower circular base portion 126 may prevent the first double-headed pin 124 and the second double-headed pin 136 from being pushed through the vertical surface 202 entirely.

The upper circular base portion 128 may be the topmost disc-shaped support segment of the first double-headed pin 124 and/or the second double-headed pin 136. The upper circular base portion 128 may help the first double-headed pin 124 and/or the second double-headed pin 136 to securely hold the rectangular surface 104 in its position after installation onto vertical surface 202. The upper circular base portion 128 may prevent dislocation and/or accidental removal of the rectangular surface 104 from its position.

The cylindrical spacer 130 may be a barrel-shaped segment of the first double-headed pin 124 and/or the second double-headed pin 136 created between the lower circular base portion 126 and the upper circular base portion 128. The cylindrical spacer 130 may create a specific gap and/or a distance between the lower circular base portion 126 and the upper circular base portion 128 of the first double-headed pin 124 and/or the second double-headed pin 136 such that the rectangular surface 104 is placed on the cylindrical spacer 130 to hang it on the vertical surface 202.

The puncturing pin 132 of the first double-headed pin 124 and/or the second double-headed pin 136 may be a thin piece of metal with a sharp point at one end and a round head forming the lower circular base portion 126 at the other end. The puncturing pin 132 may penetrate into the vertical surface 202 to create a small hole in the vertical surface 202. The first double-headed pin 124 and/or the second double-headed pin 136 may be inserted in the small hole created in the vertical surface 202 by the puncturing pin 132.

The first indentation area 134 may be a deep recess and/or a notch created in the first double-headed pin 124 between the lower circular base portion 126 and the upper circular base portion 128. The first indentation area 134 may be used to hang the rectangular surface 104 by inserting the first double-headed pin 124 in the first hole 110 and positioning the first hole 110 in the recess formed by the first indentation area 134 of the first double-headed pin 124.

The second indentation area 138 may be a deep recess and/or a notch created in the second double-headed pin 136 between the lower circular base portion 126 and the upper circular base portion 128. The second indentation area 138 may be used to hang the rectangular surface 104 by inserting the second double-headed pin 136 in the second hole 118 and positioning the second hole 118 in the recess formed by the second indentation area 138 of the second double-headed pin 136.

Figure 2:
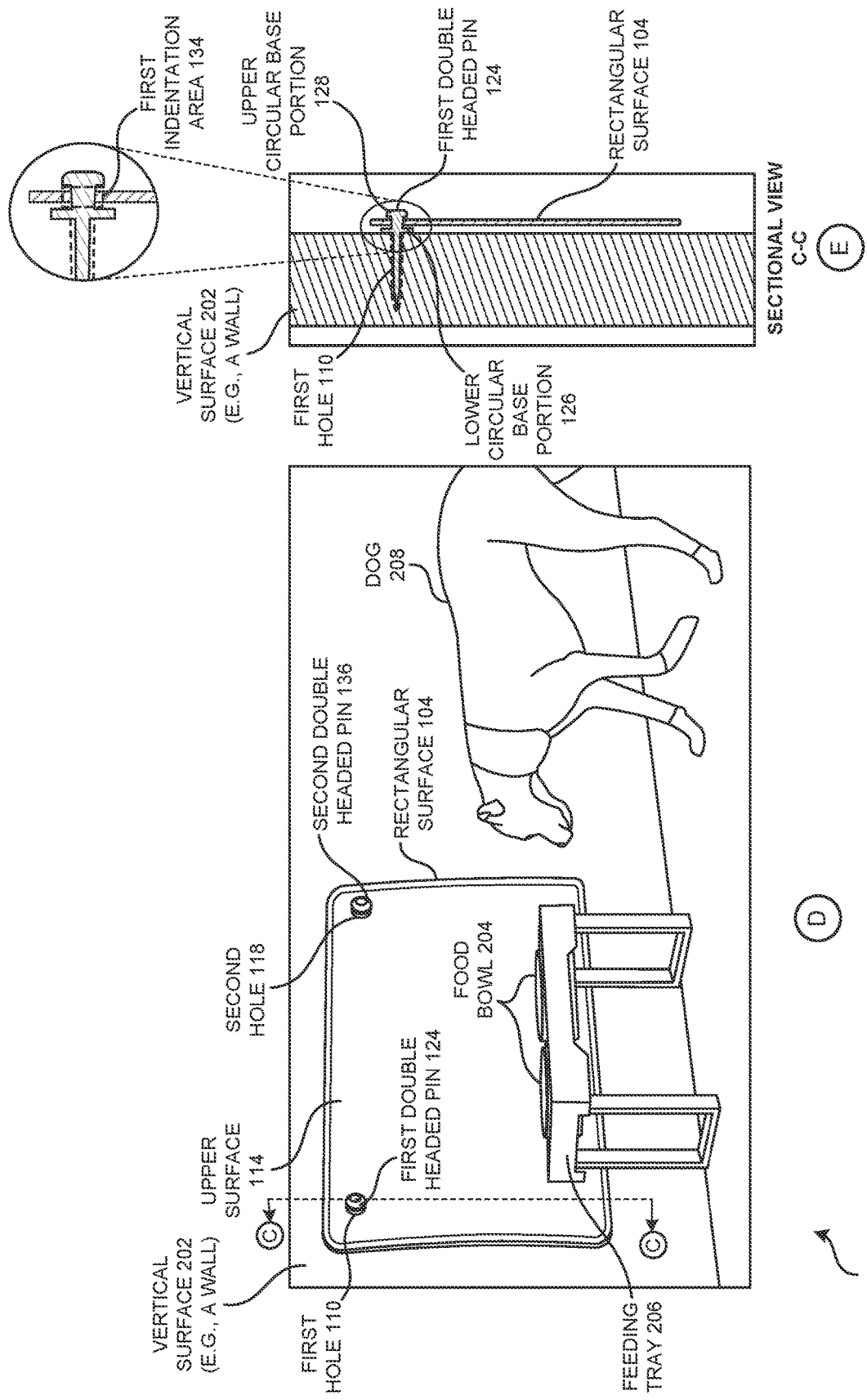
FIG. 2 is another conceptual view of the pet accessory of FIG. 1A illustrating the installation method of the pet accessory, according to one embodiment.

FIG. 2 is another conceptual view 350 of the pet accessory 102 of FIG. 1A illustrating the installation method of the pet accessory 102, according to one embodiment. As shown in "D" of FIG. 2, the rectangular surface 104 may be installed in its position onto a wall and/or a vertical surface 202 by hanging it behind a feeding tray 206 using the first double-headed pin 124 and the second double-headed pin 136 for a domesticated canine animal (e.g., a dog 208). The rectangular surface 104 may capture the food and liquid splatter 306 accidentally exiting the food bowl 204 while the dog 208 is consuming food and/or liquid from the food bowl 204 of the feeding tray 206.

In another embodiment, the rectangular surface 104 may be installed at varying heights from the floor and/or the ground behind the feeding tray 206 and/or the food bowl 204 depending on the height and/or size of the dog. For example, the rectangular surface 104 may be installed directly above the floor if the food bowl 204 is kept on the floor so that the rectangular surface 104 may capture the food and liquid splatter 306 accidentally exiting the food bowl 204 while the dog 208 is consuming food and/or liquid from the food bowl 204. Alternatively, the feeding tray 206 may be of varying height depending on the size of the dog, e.g., small, medium, and/or large. Accordingly, the rectangular surface 104 may be installed directly above the floor for a small-sized dog such that the rectangular surface 104 captures the food splatter from the food bowl 204 placed directly on the floor. Correspondingly, the rectangular surface 104 may be installed at varying heights from the floor and/or the ground behind the feeding tray 206 and/or the food bowl 204 depending on the height and/or size of the dog in elevated and/or low positions.

Sectional view C-C shown in "E" of FIG. 2, illustrates the exposed cut surface of the rectangular surface 104 when installed in the hanging position onto the vertical surface 202 as indicated by section line C-C shown in "D" of FIG. 2. As shown in the sectional view C-C, the lower circular base portion 126 of the first double-headed pin 124 remains flush with the vertical surface 202 and the rectangular surface 104 is positioned in the first indentation area 134 formed between the lower circular base portion 126 and the upper circular base portion 128 such that it does not dislocate from its position when in use. The upper circular base portion 128 and the first indentation area 134 may remain projected from the exterior plane of the vertical surface 202 such that the rectangular surface 104 is installed in its position using the first double-headed pin 124. The rectangular surface 104 may be hung in the second indentation area 138 by inserting the second double-headed pin 136 in the second hole 118 and positioning the second hole 118 in the recess formed by the second indentation area 138 of the second double-headed pin 136 analogous to the first indentation area 134.

Figure 3:
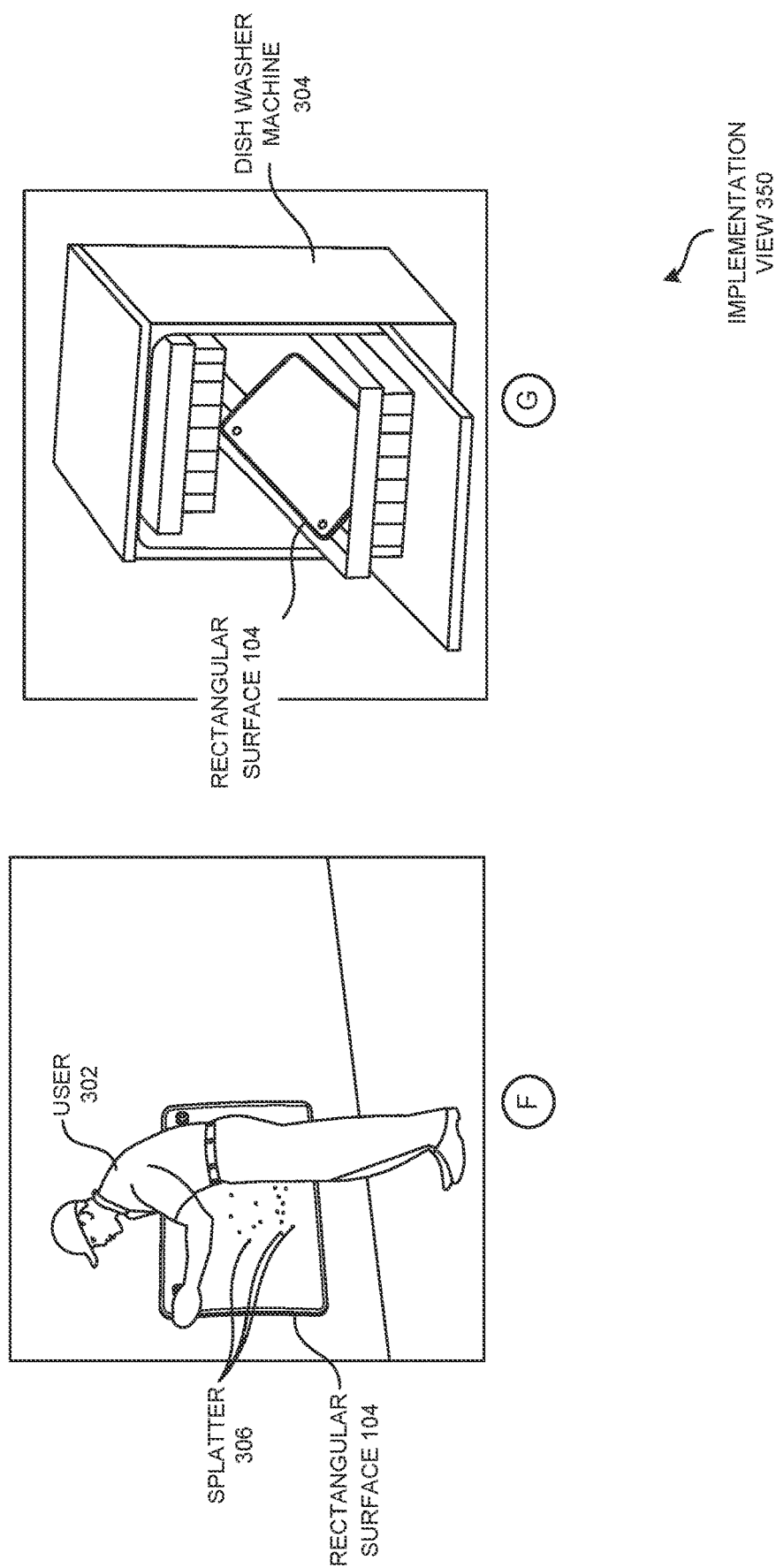
FIG. 3 is an implementation view of the pet accessory of FIG. 1A illustrating the removal and washing of the pet accessor using a washing machine, according to one embodiment.

FIG. 3 is an implementation view 350 of the pet accessory 102 of FIG. 1A illustrating the removal and washing of the pet accessory 102 using a dishwasher machine 304, according to one embodiment.

As shown in "F" of FIG. 3, the rectangular surface 104 may be uninstalled from its position by removing the first hole 110 and the second hole 118 of the rectangular surface 104 from the first double-headed pin 124 and the second double-headed pin 136. The rectangular surface 104 may be placed in a dishwasher machine 304 to wash out the food and liquid splatter 306 accumulated on the rectangular surface 104. Thus, the rectangular surface 104 may be easily cleaned using the dishwasher machine 304 and further help protect the vertical surface 202 from getting stained and/or forming unsightly patches on the wall.

Alternatively, the rectangular surface 104 may be cleaned in its installed position by wiping out the food and liquid splatter 306 accumulated on the rectangular surface 104. The nonstick silicone material forming the rectangular surface 104 may make it easy to wipe clean and dishwasher safe.

An example embodiment will now be described. Jane Doe and her family may have a pet dog at home. Jane's family may treat their dog with love and care. In turn, her pet dog may offer her family companionship, protection, and a sense of joy when they are around. Jane's family may have provided her pet dog with a feeding tray placed beside an interior wall of her entrance hall.

Jane's pet dog may remain very playful and active the whole day while with the family. Her mealtime may be its best time when it will consume its food excitedly and in a hurried manner. Jane's pet dog may have an inefficient mouth size and a long tongue. While consuming food from the feeding tray, the inefficient mouth size and long tongue of the pet dog may lead to food and water particles falling off from the mouth and exiting outward onto a floor and/or a wall instead. This may lead to unsightly smells, odor, and stains caused on the wall of her entrance hall. Jane and her family may have to wipe the wall clean a number of times before the stains get dry and form unsightly patches.

Jane's family may have brought the new pet accessory 102 as described in various embodiments of FIGS. 1-3. The pet accessory 102 described in various embodiments of FIGS. 1-3 may prevent liquid and/or residue accumulation behind a feeding container (e.g., food bowl 204) in the interior wall of her entrance hall of their home. The pet accessory 102 may capture splattered food and/or a liquid that may inadvertently exit the feeding container (e.g., food bowl 204) of Jane's pet dog. As described in various embodiments of FIGS. 1-3, Jane and her family may be able to easily clean and wipe out the splattered food from the pet accessory 102 and could even remove the rectangular surface 104 from its position to wash it using the dishwasher machine 304, making their cleaning job less tiring. Jane's family may now have more time for having a good time with their pet dog, keeping them happy.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:
1. A pet accessory, comprising;
   a rectangular surface,
      wherein the rectangular surface is molded from silicone material for use having a width that is wider than a height, wherein a first hole is formed on an upper-left corner of an upper surface of the rectangular surface along the width of a left side of the pet accessory, and wherein a second hole is formed on an upper-right corner of the upper surface of the rectangular surface along the width of a right side of the pet accessory;

a first double-headed pin, wherein the first double-headed pin includes a lower circular base portion, an upper circular base portion, a cylindrical spacer, and a long cylindrical shaft pin, wherein the lower circular base portion of the first double-headed pin is separated from its upper circular base portion by approximately half the width of the upper circular base portion, and the cylindrical spacer is fixed in place, centrally positioned between the lower and upper circular base portions of the first double-headed pin, resulting in the creation of a first indentation area, and wherein the lower circular base portion of the first double-headed pin having the long cylindrical shaft pin is used to insert in a vertical surface; and a second double-headed pin, wherein the second double-headed pin includes the lower circular base portion, the upper circular base portion, the cylindrical spacer, and the long cylindrical shaft pin, wherein the lower circular base portion of the second double-headed pin is separated from its upper circular base portion by approximately half the width of the upper circular base portion, and the cylindrical spacer is fixed in place, centrally positioned between the lower and upper circular base portions of the first double-headed pin, resulting in the creation of a second indentation area, and wherein the lower circular base portion of the second double-headed pin having the long cylindrical shaft pin is used to insert in the vertical surface.

2. The pet accessory of claim 1 wherein the pet accessory is mounted on a wall of a home, and is washable in a dishwasher.

3. The pet accessory of claim 2 wherein the pet accessory to prevent liquid and residue accumulation behind a feeding container in the home.

4. The pet accessory of claim 1 wherein the pet accessory is designed for a domesticated canine animal, such that when the domestic canine animal feeds itself from the feeding container that is placed immediately in front of the pet accessory which is perpendicularly hung on a vertical surface, the pet accessory to capture splattered at least one of a food and a liquid which inadvertently exits the feeding container when the domesticated canine animal is accessing at least one of the food and the liquid from the feeding container.

5. The pet accessory of claim 4 wherein the first double-headed pin is penetrable into the vertical surface through the long cylindrical shaft pin of the first double-headed pin that extends from the lower circular base portion of the first double-headed pin, such that the lower circular base portion of the first double-headed pin is flush against the vertical surface when the long cylindrical shaft pin is fully inserted into the vertical surface, and such that cylindrical spacer and the upper circular base portion of the first double-headed pin protrudes from the surface of the wall.

6. The pet accessory of claim 5 wherein the second double-headed pin is penetrable into the vertical surface through the long cylindrical shaft pin of the second double-headed pin that extends from the lower circular base portion of the second double-headed pin, such that the lower circular base portion of the second double headed pin is flush against the vertical surface when the long cylindrical shaft pin is fully inserted into the vertical surface, and such that the cylindrical spacer and the upper circular base portion of the second double headed pin protrudes from the surface of the wall.

7. The pet accessory of claim 6 wherein the first hole of the rectangular surface is slightly larger in area than the first upper circular base portion, such that the rectangular surface is placeable on the cylinder spacer between the lower circular base portion and the upper circular base portion of the first double-headed pin.

8. The pet accessory of claim 7 wherein the second hole of the rectangular surface is slightly larger in area than the second upper circular base portion, such that the rectangular surface is placeable on the cylinder spacer between the lower circular base portion and the upper circular base portion of the second double headed pin.

9. The pet accessory of claim 8 wherein the first indentation area created by the cylindrical spacer of the first double-headed pin allows for secure attachment of the rectangular surface to the first double-headed pin preventing accidental dislodging and detachment.

10. The pet accessory of claim 9 wherein the second indentation area created by the cylindrical spacer of the second double-headed pin allows for secure attachment of the rectangular surface to the second double-headed pin ensuring stability and preventing movement during use.

11. A pet accessory, comprising;

a rectangular surface having a first hole is formed on an upper-left corner of an upper surface of the rectangular surface along the width of a left side of the pet accessory, and a second hole is formed on an upper-right corner of the upper surface of the rectangular surface along the width of a right side of the pet accessory; and a pair of double-headed pins, each having a lower circular base portion, an upper circular base portion, a cylindrical spacer, and a long cylindrical shaft pin, wherein the pair of double-headed pins are used to secure the rectangular surface to a wall of a home.

12. The pet accessory of claim 11 wherein the pet accessory is mounted on the wall of the home, and is washable in a dishwasher.

13. The pet accessory of claim 12 wherein the pet accessory to prevent liquid and residue accumulation behind a feeding container in the home.

14. The pet accessory of claim 11 wherein the pet accessory is designed for a domesticated canine animal, such that when the domestic canine animal feeds itself from the feeding container that is placed immediately in front of the pet accessory which is perpendicularly hung on a vertical surface, the pet accessory to capture splattered at least one of a food and a liquid which inadvertently exits the food container when the domesticated canine animal is accessing at least one of the food and the liquid from the feeding container.

15. The pet accessory of claim 14 wherein the first double-headed pin is penetrable into the vertical surface through the long cylindrical shaft pin of the first double-headed pin that extends from the lower circular base portion of the first double-headed pin, such that the lower circular base portion of the first double-headed pin is flush against the vertical surface when the long cylindrical shaft pin is fully inserted into the vertical surface, and such that the cylindrical spacer and the upper circular base portion of the first double-headed pin protrudes from the surface of the wall.

16. A pet accessory, comprising;
a rectangular surface,
wherein a first hole is formed on an upper-left corner of an upper surface of the rectangular surface along the width of a left side of the pet accessory, and
wherein a second hole is formed on an upper-right corner of the upper surface of the rectangular surface along the width of a right side of the pet accessory;
a first double-headed pin,
wherein the first double-headed pin includes a lower circular base portion, an upper circular base portion, a cylindrical spacer, and a long cylindrical shaft pin,
wherein the lower circular base portion of the first double-headed pin is separated from its upper circular base portion by approximately half the width of the upper circular base portion, and the cylindrical spacer is fixed in place, centrally positioned between the lower and upper circular base portions of the first double-headed pin, resulting in the creation of a first indentation area, and
wherein the lower circular base portion of the first double-headed pin having the long cylindrical shaft pin is used to insert in a vertical surface; and
a second double-headed pin,
wherein the second double-headed pin includes the lower circular base portion, the upper circular base portion, the cylindrical spacer, and the long cylindrical shaft pin,
wherein the lower circular base portion of the second double-headed pin is separated from its upper circular base portion by approximately half the width of the upper circular base portion, and the cylindrical spacer is fixed in place, centrally positioned between the lower and upper circular base portions of the second double-headed pin, resulting in the creation of a second indentation area, and
wherein the lower circular base portion of the second double-headed pin having the long cylindrical shaft pin used to insert in the vertical surface.

17. The pet accessory of claim 16 wherein the pet accessory is mounted on a wall of a home, and is washable in a dishwasher.

18. The pet accessory of claim 17 wherein the pet accessory to prevent liquid and residue accumulation behind a feeding container in the home.

19. The pet accessory of claim 16 wherein the pet accessory is designed for a domesticated canine animal, such that when the domestic canine animal feeds itself from the feeding container that is placed immediately in front of the pet accessory which is perpendicularly hung on a vertical surface, the pet accessory to capture splattered at least one of a food and a liquid which inadvertently exits the food container when the domesticated canine animal is accessing at least one of the food and the liquid from the food container.

20. The pet accessory of claim 19 wherein the first double-headed pin is penetrable into the vertical surface through the long cylindrical shaft pin of the first double-headed pin that extends from the lower circular base portion of the first double-headed pin, such that the lower circular base portion of the first double-headed pin is flush against the vertical surface when the long cylindrical shaft pin is fully inserted into the vertical surface, and such that the cylindrical spacer and the upper circular base portion of the first double-headed pin protrudes from the surface of the wall.

* * * * *